(12) United States Patent
Bryner

(10) Patent No.: US 11,761,576 B1
(45) Date of Patent: Sep. 19, 2023

(54) PORTABLE COLLAPSIBLE SUPPORT FOR ELECTRONIC EQUIPMENT

(71) Applicant: David Bryner, Apollo Beach, FL (US)

(72) Inventor: David Bryner, Apollo Beach, FL (US)

(*) Notice: Subject to any disclaimer, the term of this patent is extended or adjusted under 35 U.S.C. 154(b) by 79 days.

(21) Appl. No.: 17/358,827

(22) Filed: Jun. 25, 2021

Related U.S. Application Data

(63) Continuation-in-part of application No. 16/678,356, filed on Nov. 8, 2019, now Pat. No. 11,044,991.

(60) Provisional application No. 62/824,552, filed on Mar. 27, 2019.

(51) Int. Cl.
   *F16M 11/38* (2006.01)
   *A47B 23/04* (2006.01)

(52) U.S. Cl.
   CPC ........... *F16M 11/38* (2013.01); *A47B 23/042* (2013.01); *F16M 2200/066* (2013.01)

(58) Field of Classification Search
   CPC . F16M 11/38; F16M 2200/066; A47B 23/042
   See application file for complete search history.

(56) References Cited

U.S. PATENT DOCUMENTS

| | | | | |
|---|---|---|---|---|
| 297,219 A | * | 4/1884 | Anthony | A47B 23/002 108/166 |
| 327,816 A | * | 10/1885 | Newbourg | A47B 23/042 248/460 |
| 558,285 A | * | 4/1896 | Kunze | A47B 23/042 248/455 |
| 1,790,487 A | * | 1/1931 | Ruhnau | A47B 23/042 248/448 |
| 1,839,291 A | * | 1/1932 | Barbour | A47B 23/00 248/455 |
| 3,061,157 A | * | 10/1962 | Moss | A45C 5/00 190/39 |
| 4,522,364 A | * | 6/1985 | Charney | A47B 23/043 248/460 |
| 4,844,644 A | * | 7/1989 | Roberts | B42D 5/045 40/120 |
| 4,852,498 A | * | 8/1989 | Judd | G06F 1/1632 190/11 |
| 4,856,627 A | * | 8/1989 | Polatov | A45C 9/00 190/11 |

(Continued)

FOREIGN PATENT DOCUMENTS

WO   WO-2015063454 A1 * 5/2015 ............... A47F 5/10

*Primary Examiner* — Hanh V Tran
(74) *Attorney, Agent, or Firm* — The Patent Professor, P.A.; John Rizvi

(57) ABSTRACT

A portable, collapsible support for holding electronic equipment including programmable logic controllers (PLC), human machine interfaces (HMI), instruments, switches, Din rail mounting devices, and other equipment when testing, demonstrating, programming, or repairing such devices at remote job sites, testing labs or facilities, trade shows, training centers, and other places. The portable, collapsible support includes a base having a holding bar in parallel with a back bar forming a holding recess to hold HMIs, a cover including a Din rail, and a pair of mounting pegs for holding the electronic equipment, and a pair of locking arms for releasably, pivotably locking the cover in an open, vertical position while holding the electronic equipment, or for closing the cover to easily carry and transport the collapsible support from one location to another.

20 Claims, 11 Drawing Sheets

(56) References Cited

U.S. PATENT DOCUMENTS

| | | | | |
|---|---|---|---|---|
| 5,290,002 A * | 3/1994 | Cohen | A47B 23/043 | 248/456 |
| 5,810,316 A * | 9/1998 | Eby | A47B 23/043 | 248/456 |
| 5,884,889 A * | 3/1999 | Crosby | A47B 23/044 | 248/444 |
| 5,938,096 A * | 8/1999 | Sauer | A47B 23/002 | 224/625 |
| 6,530,475 B1 * | 3/2003 | Penney | A45C 13/02 | 190/110 |
| 6,811,006 B1 * | 11/2004 | Mundle | A45C 13/02 | 190/18 R |
| 7,172,167 B2 * | 2/2007 | Phifer | A47B 23/042 | 190/30 |
| 7,364,129 B1 * | 4/2008 | Levari, Jr. | A47G 23/0216 | 108/4 |
| 7,543,704 B2 * | 6/2009 | Miller | B25H 1/10 | 190/11 |
| 7,731,147 B2 * | 6/2010 | Rha | A47B 23/06 | 248/447 |
| 8,167,131 B1 * | 5/2012 | Anderson | A45F 3/02 | 190/102 |
| 8,724,312 B2 * | 5/2014 | Jones | G06F 1/1632 | 361/679.44 |
| 8,991,319 B2 * | 3/2015 | Korpi | A47B 23/043 | 108/44 |
| 9,380,847 B1 * | 7/2016 | Killebrew | A45C 9/00 | |
| 10,750,855 B2 * | 8/2020 | Bender | A47B 13/088 | |
| 2011/0109129 A1 * | 5/2011 | Brill | B60N 3/103 | 297/188.04 |
| 2011/0155024 A1 * | 6/2011 | McCaffrey | B60N 3/004 | 108/26 |
| 2011/0269339 A1 * | 11/2011 | Baran | H05K 7/1474 | 439/532 |
| 2016/0015141 A1 * | 1/2016 | Feinberg | A47B 23/042 | 206/45.24 |
| 2016/0286953 A1 * | 10/2016 | Castro | A47B 23/042 | |
| 2017/0318958 A1 * | 11/2017 | Asante | A47B 13/023 | |
| 2018/0098452 A1 * | 4/2018 | Baker | H05K 7/183 | |
| 2019/0053635 A1 * | 2/2019 | Cheung | B60N 3/004 | |
| 2020/0198786 A1 * | 6/2020 | Olson | B64D 11/0638 | |

* cited by examiner

PORTABLE COLLAPSIBLE SUPPORT FOR ELECTRONIC EQUIPMENT

CROSS-REFERENCE TO RELATED APPLICATIONS

This Continuation-in-part patent application claims the benefit of U.S. Nonprovisional patent application Ser. No. 16/678,356m filed on Nov. 8, 2019, which claims the benefit of Provisional Patent Application Ser. No. 62/824,552, filed on Mar. 27, 2019, all of which are incorporated by reference herein in their entirety.

FIELD OF THE INVENTION

The present invention relates generally to supports, and more particularly, to a portable, collapsible support for holding electronic equipment including programmable logic controllers (PLC), human machine interfaces (HMI), instruments, switches, Din rail mounting devices, when testing, demonstrating or repairing such equipment that is easily transportable from one location to another.

BACKGROUND OF THE INVENTION

There are a variety of electronic equipment including controllers and interfaces that are used today to control operational systems and devices associated with manufacturing processes, HVAC systems, traffic lighting systems, robotic applications, or security monitoring systems, to name a few. Examples of controllers and interfaces generally include programmable logic controllers (PLC), human-machine interfaces (HMI), graphic user interface (GUI) modules, and other electronic equipment. Such electrical equipment is often housed in ventilated enclosures, or supported or mounted on vertical and horizontal surfaces, such as on walls, vertical posts, or directly onto the machines themselves. Advancements in technology have helped to reduce the size of components used, have developed faster processors, and have improved memory, to provide controllers and interfaces that are faster, capable of storing and processing larger amounts of data, and are smaller in physical size requiring less storage or housing space. Engineering advancements in controls and interfaces have provided functional features that were simply not available with older generation devices. For example, some new features include self-diagnostics, machine-learning capabilities, the ability to control a greater number of devices, or are compatible for use in more, diverse applications. Both old and new generation controllers and interfaces are typically prone to necessary repairs, maintenance, or testing to maintain their operative state.

There remains an on-going need to service controls and other electronic equipment employed in various applications such as in hospitals, manufacturing facilities, schools, office buildings, and industry in general. It is incumbent on service man or programmers to troubleshoot, repair, program, or run diagnostic tests on electronic equipment such as programmable logic controllers PLCs, human-machine interfaces HMIs, graphical user interfaces GUIs, and other equipment. In doing so, the electronic equipment is often removed from a housing or wall, or dismounted from an attachment support, to provide unrestricted access to the equipment. Many service man are simply not equipped to properly handle and support such electronic equipment when servicing the equipment on site, or when testing or repairing the equipment in designated labs. It is common practice for service man or programmers to place PLCs or HMI equipment on their knees, on cardboard or wooden boxes, on a foam or padding support, on a bench, desk, or stand, or simply rest the equipment on the floor of the visiting facility. In some situations, service man resort to holding the electronic equipment in hand while attempting to test, repair or program the equipment making it difficult, cumbersome, and at times impractical.

The need for adequately supporting electronic devices such as PLCs or HMIs is also sought in other areas as well. For example, in an effort to promote sales and marketing of controllers and other electronic equipment involving new generation PLCs, or HMIs, many manufactures, vendors, or distributors attend trade shows, conventions, or visit industrial sites or technical schools, to demonstrate and train employees about the newly developed functionalities associated with the modern electronic equipment for use in industry. In doing so, the electronic equipment is often supported on tables, benches, or are at times, attached to temporary supports, stands or racks to demonstrate operative controls, to indicate or illustrate location of features on the equipment, illustrate visual status indicators, or to teach particular programming techniques or features. The electronic equipment is often supported in awkward positions that make it difficult for individuals to view the peripheral layout of the equipment. Thus, the need for demonstrating the functional capabilities and physical layout of the equipment is hindered by inadequately supporting the equipment during demonstrative sessions making it difficult for students, employees and other individuals to fully grasp and ascertain the functional attributes of the electronic equipment.

Conventional supports have been developed to assist individuals in testing, repairing, programming, or demonstrating electronic equipment comprising PLCs, or HMIs. Many supports generally comprise a base, a vertical member extending upwards from the base, and a holding bracket or hooks to support the electronic equipment. These prior art supports are generally fixed or permanently installed in place and not amendable for carrying and transporting from one location to another. Other supports include benches or tables with wheels to roll the wheeled support along the floor, but provides limited use when transporting electronic equipment to different geographical areas, as such supports are heavy, bulky, and cumbersome to load in transport or service vehicles. Other electronic equipment supports are often designed and engineered for use with a particular type of PLC or HMI, or for use in a particular application, or are attached permanently to a vertical surface, or in a service rack.

Accordingly, there is an established need to solve at least one of the aforementioned problems and provide a portable, collapsible support configured to hold a variety of different electronic devices including PLCs and HMIs, that is easily carried and transported from one location to another, and is amendable for use in various settings and applications when testing, programming, repairing, or demonstrating PLCs, HMIs and other industrial devices and equipment.

SUMMARY OF THE INVENTION

The present invention is directed to a portable, collapsible support for holding a variety of electronic equipment including programmable logic controllers (PLC), human machine interfaces (HMI), instruments, switches, Din rail mounting devices, and other equipment when testing, demonstrating, programming, or repairing such electronic equipment at various places including remote job sites, test labs, manufacturing or processing facilities, at trade shows, training centers, and other places. The portable, collapsible support comprises a base including a holding bar in parallel with a back bar, cover including an inner surface, a Din rail, and mounting pegs for holding electronic equipment, and a pair of locking arms for releasably, pivotably locking the cover in an open position to hold the electronic equipment, or in a closed position to carry and transport the support from one location to another.

A first embodiment of the invention provides a portable, collapsible support for holding electronic equipment, the portable, collapsible support comprising: a base including opposite side edges, a planar upper surface opposite a bottom surface, a holding bar attached to, and traversing the planar upper surface, a back bar extending along a back end of the planar upper surface, where the holding bar, and back bar are disposed in parallel with each other on the planar upper surface in a spaced apart relation defining a recess for holding electronic equipment; a cover including opposite side edges, and a planar inner surface opposite an outer surface, a pair of locking arms, each locking arm having one end attached to opposite side edges of the base, and another end attached to opposite side edges of the cover, and wherein the pair of locking arms articulate to pivot the cover in a releasably locked, open position away from the planar upper surface, and in a closed position.

In one aspect, each of the pair of locking arms includes a first link having a first end and a second end, and a second link having another first end and another second end, where the first end is attached to the opposite side edges of the cover, and the another first end is attached to opposite side edges of the base, with the second end and the another second end rotatably attached together to pivot the cover in an open and closed position.

In one aspect, the portable, collapsible support further comprises at least one hinge having a first member rotatably attached to a second member, where the first member is attached to the cover, and the second member is attached to said back end of the base.

In another aspect, the at least one hinge includes another hinge having another first member rotatably attached to another second member, where the another first member is attached to the cover, and the another second member is attached to the back end of the base.

In one aspect, the portable, collapsible support further includes a Din rail mounted to the planar inner surface of the cover. In one embodiment, the Din rail is mounted to the planar inner surface along a horizontal axis. Din rail is disposed on the planar inner surface and includes opposite rail ends that are equally spaced from the opposite side edges of the cover.

In one aspect, the portable, collapsible support further includes mounting pegs disposed on the planar inner surface of the cover, above the Din rail. The mounting pegs are spaced apart from each other along a horizontal axis, and adjacent a top edge of the cover. The mounting pegs extend outwards from said planar inner surface of said cover beyond said Din rail.

In yet another aspect, the holding bar includes a planar top integral with a first and a second vertical side, where the first vertical side readily engages a peripheral edge of the electronic equipment when disposed within the recess.

In one aspect, the back bar includes a planar top integral with a vertical bar side in parallel with the first vertical side. Portions of the planar inner surface of the cover rest on the planar top of the holding bar, and planar top of the back bar when the cover is pivoted in the closed position.

In one aspect, the Din rail is mounted to the inner surface of the cover such that when the cover is in the closed position, the Din rail is situated in parallel with the second vertical side of the holding bar and above the planar upper surface of the base, and the mounting pegs are mounted to the inner surface of the cover such that when the cover is in the closed position, the mounting pegs are situated above the planar upper surface of the base a predetermined distance.

In yet another aspect, the holding recess, mounting pegs, and Din rail are configured for removably holding electronic equipment including a programmable logic controller, a tablet, or human machine interface.

In a secondary embodiment of the present invention, a portable, collapsible support for holding electronic equipment, the portable, collapsible support is provided, comprising:

a base including opposite side edges, a planar upper surface opposite a bottom surface, a channel traversing the planar upper surface of the base, and a recess provided substantially at a central portion of the base;

at least one hinge plate having a resting surface and raised lip hingeably and movably attached to an inner surface of the recess on the base for supporting equipment when the hinge plate is in an erect position;

a cover including opposite side edges, and a planar inner surface opposite an outer surface, and a recess provided on the planar inner surface of the cover;

a movable arm device hingeably attached to an inner surface of the recess provided on the cover, the movable arm configured for supporting equipment when in an erect position:

a Din rail mounted to the planar inner surface of the cover; and a pair of locking arms, each locking arm having one end attached to the opposite side edges of the base, the other end attached to opposite side edges of the cover, wherein the pair of locking arms articulate to pivot the cover in a releasably locked, open position away from the planar upper surface, and in a closed position.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a portable, collapsible support adapted for holding a variety of electronic equipment including programmable logic controllers (PLC), human machine interfaces (HMI), instruments, switches, Din rail mounting devices, when testing, demonstrating, programming, or repairing the electronic equipment at various locations.

Figure 1:
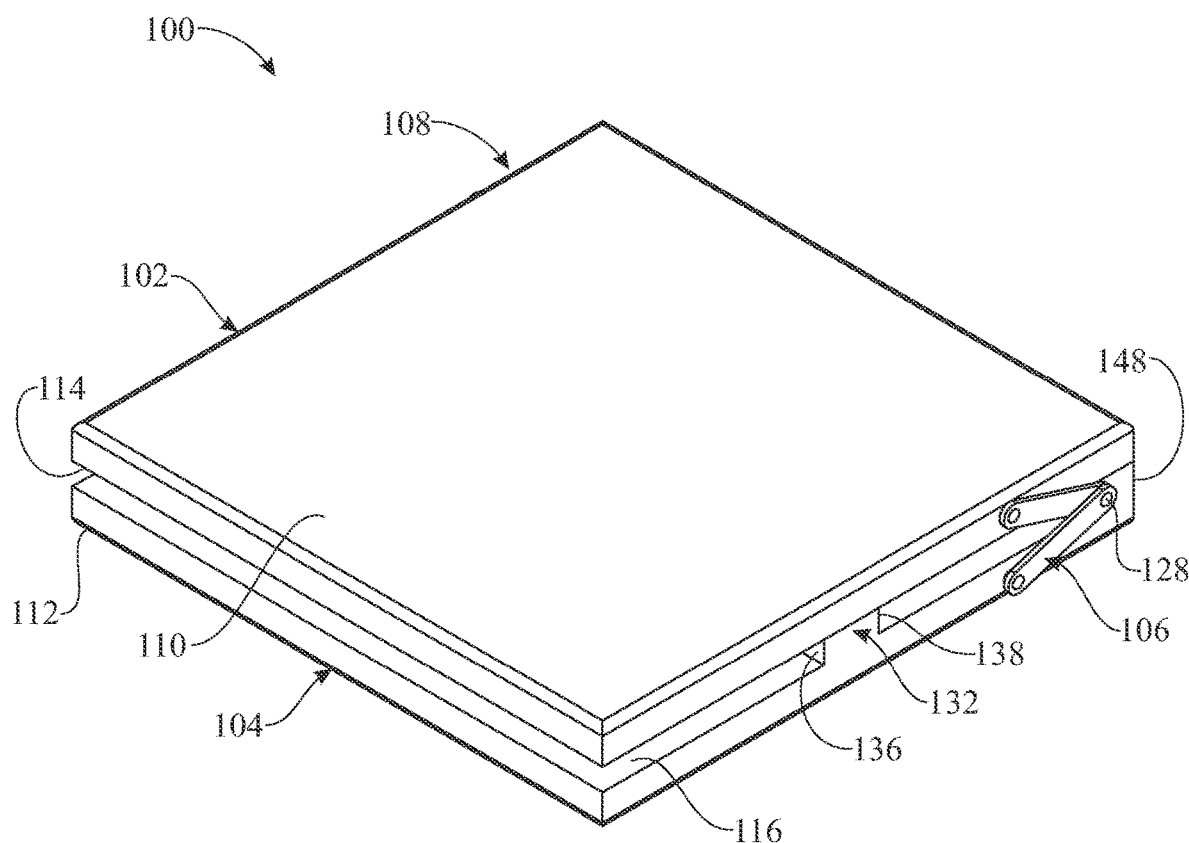
FIG. 1 presents a top, perspective view of a portable, collapsible support for repairing, testing, programming, or demonstrating electronic equipment such as programmable logic controllers (PLC), human machine interfaces (HMI), instruments, switches, DIN rail mounting devices, or other industrial equipment or devices, showing a cover pivoted in a closed position on a support base, in accordance with an embodiment of the present invention.
Figure 2:
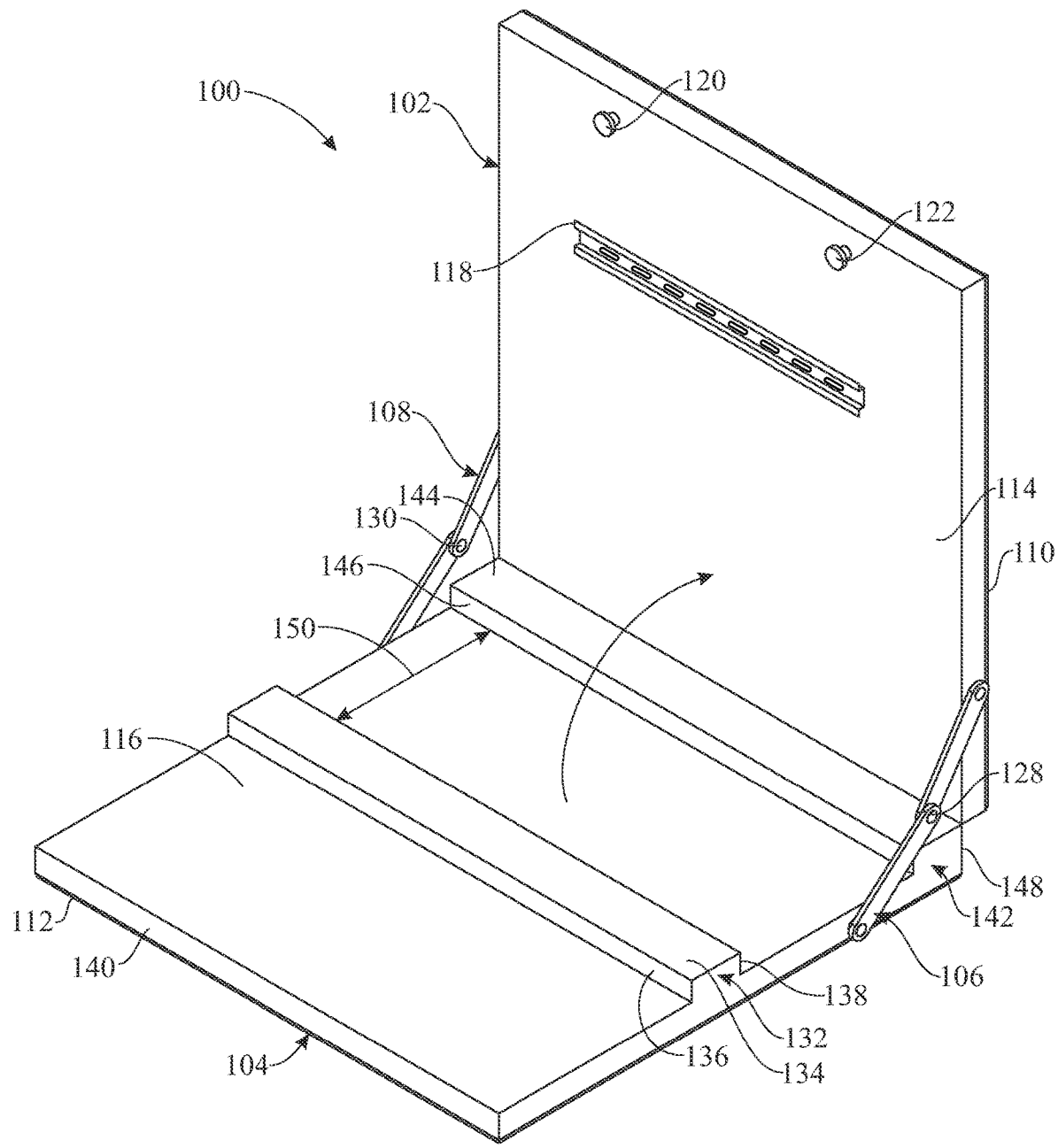
FIG. 2 presents a front, perspective view of the portable, collapsible support of FIG. 1, showing the cover pivoted in a releasably, locked, open position, via locking arms, and including a Din rail, and a pair of mounting pegs attached to the inner surface of the cover, and a holding bar in parallel with a back bar provided on the support base.

Referring now to FIGS. 1 and 2, wherein like elements are represented by like numerals throughout, there are shown perspective views of a portable, collapsible support 100 for holding electronic equipment when testing, programming, repairing, or demonstrating the electronic equipment in various settings, in accordance with an embodiment of the present invention. The portable, collapsible support 100 generally comprises a cover 102 that is pivotably, or foldably attached to a support base 104 via, articulating connections comprising a pair of locking arms 106, 108, and a pair of hinges 152, 154, as better illustrated in FIG. 3. In one exemplary embodiment, both the cover 102, and support base 104 comprises a square geometric shape, and each include planar surfaces 110, 112, 114, and 116. As illustrated in the FIGS. 1 and 2, planar surface 114 may be depicted as an inner surface, and planar surface 116 depicted as an inner surface, or an upper surface. The geometric and dimensional shape of cover 102 and base 104 may comprise any variety of different sizes, lengths, widths, heights, and shapes. The structural dimension of the cover 102 and base 104 is selected to physically support and hold electronic equipment having different weight bearing loads. As such, the cover 102, and support base 104 may be constructed from any of metal, a durable plastic or nylon material, or natural, synthetic or non-synthetic materials including wood. The material selected to construct the portable, collapsible support 100 should take into consideration the possibilities that the support 100 will be used in harsh, or wet environments, thus water resistant, or rust proof, or corrosion resistant materials can be employed. As such, the cover 102, and base 104 may be constructed from a galvanized steel, aluminum, or stainless steel material. Alternatively, the cover 102, and/or base 104 may be coated with a clear plastic protective film or polymer, a rubber coating, or a rust resistance paint.

In referring to FIG. 2, support 100 includes at least one Din rail 118 that is attached to the inner surface 114 of the cover 102, and adapted to removably hold electronic equipment having Din rail mountable brackets. For example, electronic equipment, such as PLCs. often include Din rail mountable brackets situated on the back wall of the PLC to removably mount the PLC to Din rails. As such, Din rail 118 accommodates removeable attachment of PLC's equipped with Din rail mountable brackets. It is understood that the collapsible support 100 may include any number of Din rails 118 each having the same or different lengths. In exemplary embodiment, Din rail 118 is attached to the inner surface 114 of the cover 102 along a horizontal axis but may be oriented vertically or diagonally if preferred. Din rail 118 may comprise a durable plastic, aluminum, or steel material able to withstand the loaded bearing weight of electronic equipment when supported on the Din rail 118. One or more Din rails 118 are attached to the inner surface 114 of the cover 102 using fasteners including for example, screws, a strong adhesive, clips, clamps, nuts and bolts, rivets, or other fasteners.

Figure 4:
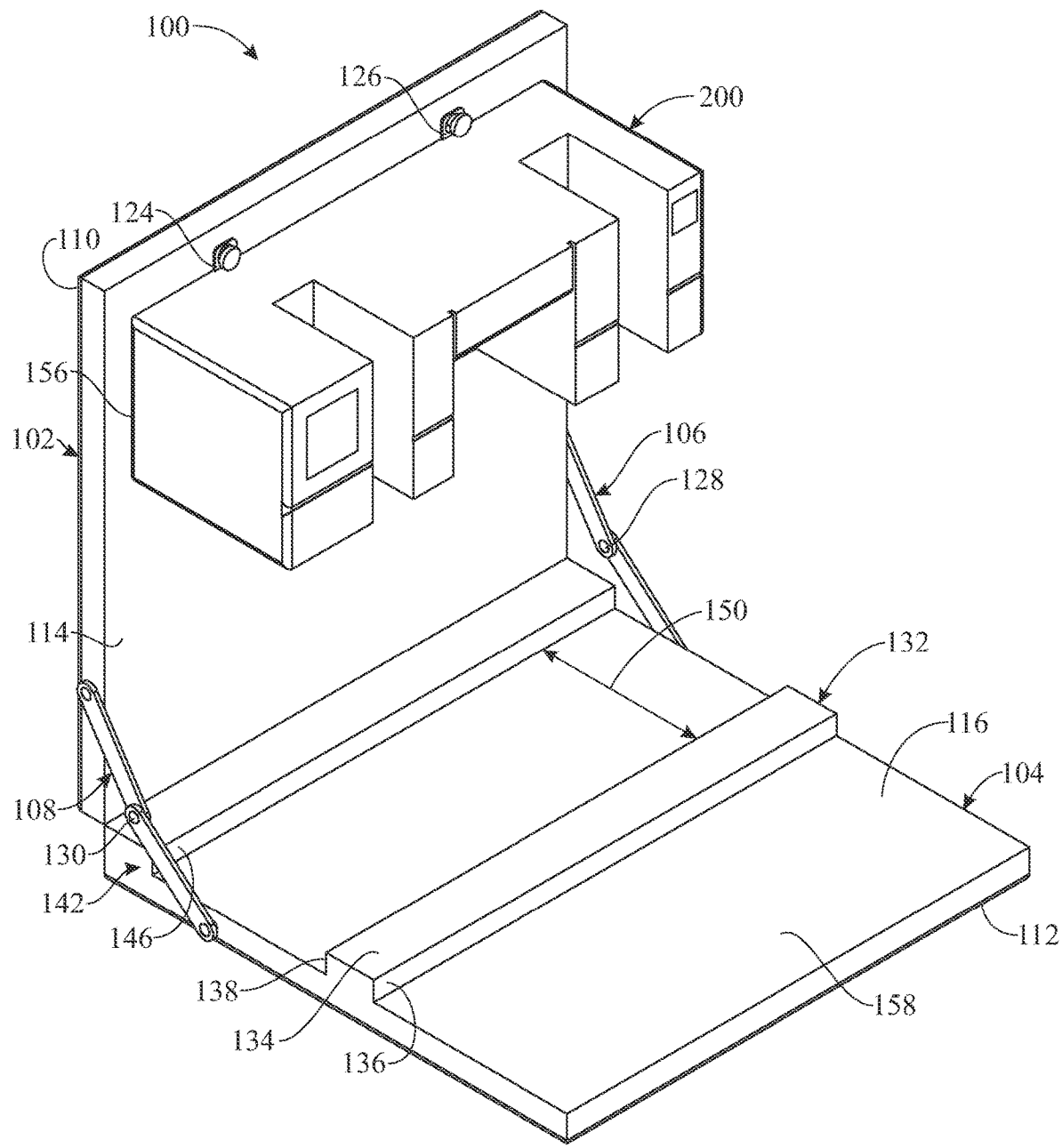
FIG. 4 presents a front, perspective view of the portable, collapsible support, showing the cover pivoted in the releasably, locked, open position, and a programmable logic control (PLC) removably attached to the pair of mounting pegs provided on the inner surface of the cover.

A pair of mounting pegs 120, 122 are provided on the inner surface 114 of the cover 102 and configured to hold electronic equipment with holding brackets 124, 126, as better illustrated in FIG. 4. Each mounting peg 120, 122 generally extends outwards a certain distance from the inner surface 114 of the cover 102, beyond the Din rail 118 to securely hold electronic equipment having holding brackets 124, 126 in proper horizontal orientation, as explained further below with FIG. 4. Each mounting peg 120, 122 may include a plastic, wood, or metal member having a threaded shank that is threaded within the inner surface 114 of the cover 102. Alternatively, a plurality of holes can be pre-drilled anywhere within the inner surface 114 of the cover 102 to accommodate removable insertion of the mounting pegs 120 and 122. The plurality of holes allow positional adjustment of the mounting pegs 120, 122 giving users or service man the ability to use the support 100 for holding electronic equipment that may have different holding brackets, or apertures. Alternatively, mounting pegs 120, 122 may be arranged on the inner surface 114 of the cover 102 in a predetermined configuration to accommodate holding particular PLCs having holding brackets 124, 126 or holding apertures of known sizes, dimensions, or measurements. For example, if a particular electronic equipment such as a PLC has known dimensional spacing of holding brackets or holding apertures, then in one embodiment, the mounting pegs 120, 122 may be adjustably or fixedly positioned to the inner surface 114 of the cover 102 in the requisite spaced relation to accommodate that known dimension.

The cover 102 is pivotably attached to support base 104, via, a pair of locking arms 106, 108 disposed on opposite sides of the cover 102 and base 104 to pivotably lock the cover 102 in an open position, as denoted by the directional arrow in FIG. 2. Each locking arm 106, 108 comprises a pair of links where each link includes a first end and a second end. Each second end is attached together by an articulated connection 128, and 130, and a first end of one link is attached to the side edge of the cover 102, and a first end of another link is attached to the side edge of the base 104. In one example, each articulated connection 128, 130 generally comprises a pin that extends through aligned holes provided in the second ends of the links where the pin is compressed in place to couple the links together to provide articulated motion. The links pivots about the articulated connection 128, 130 to align along a general straight axis with each other, locking the cover 102 in an open position. A user can apply a slight pressure at the articulated point to unlock the locking arms 106, 108 allowing the pair of links to fold and the cover 102 to pivot downwards. The locking arms 106, 108 may comprise any of durable plastic, metal such as aluminum or stainless steel, or any well-known locking arms currently available on the market. It is understood that other well-known articulating mechanism can be used to replace the locking arms 106, and 108.

Figure 5:
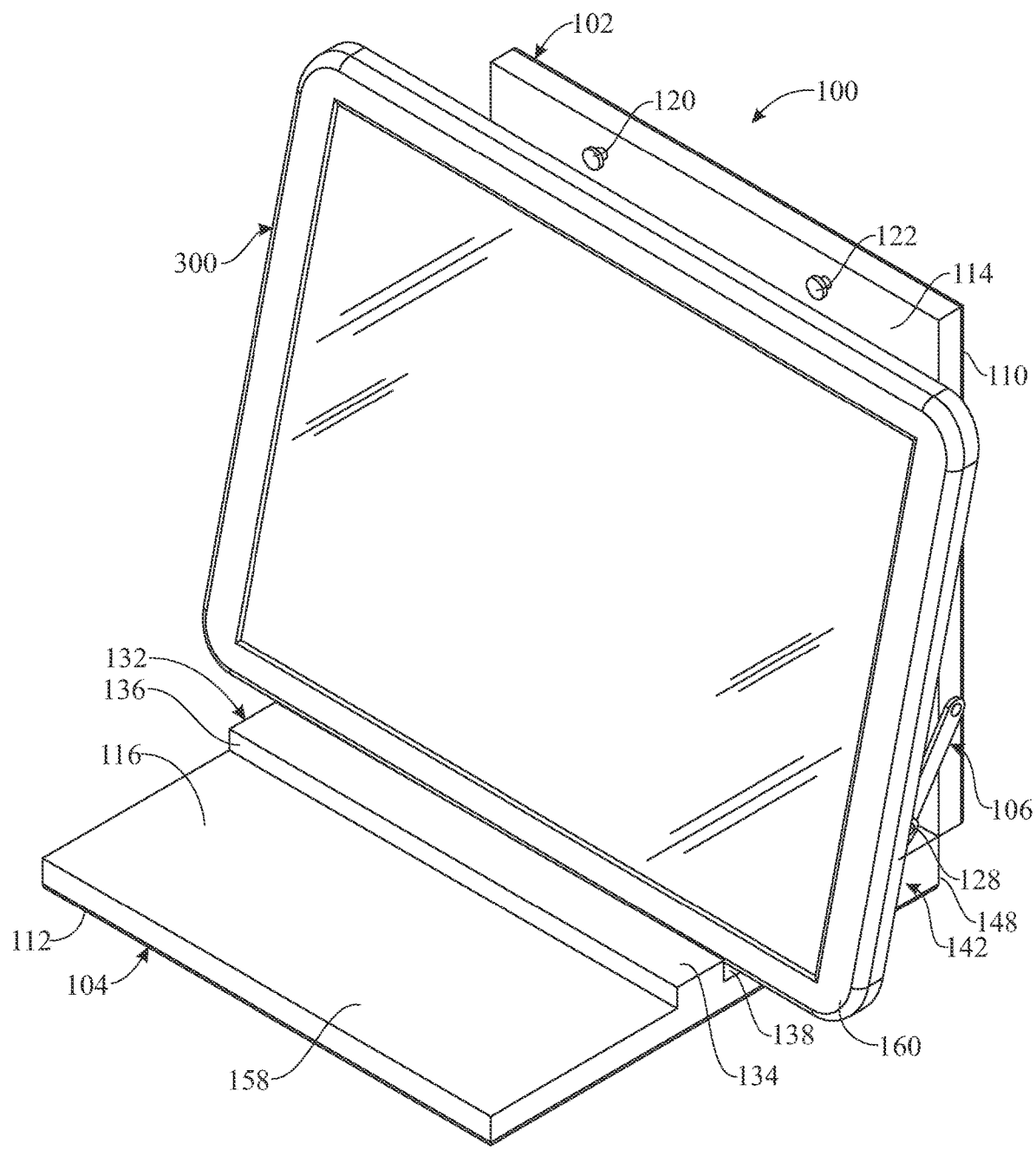
FIG. 5 presents a front, perspective view of the portable, collapsible support, showing the cover pivoted in the releasably, locked, open position, and a human-machine interface (HMI) disposed in a recess while engaging the holding bar to retain the HMI in a generally, upright position for viewing a display screen of the HMI.

With continued reference made to FIG. 2, a holding bar 132 is provided on the upper surface 116 of the support base 104 to functionally hold electronic equipment in place to prevent the equipment from sliding outwards, as shown with a human-machine interface HMI in FIG. 5. In one embodiment, a generally rectangular body having a planar top 134, and two vertical sides 136, 138 extending upwards from the upper surface 116 where each vertical side 136, 138 includes a predetermined height, defines the holding bar 132. In one embodiment, the holding bar 132 extends across, or traverses, the planar upper surface 116 of the support base 104 such that a vertical side 136 of the holding bar 132 is aligned parallel with the front edge 140 of support base 104. In one embodiment, holding bar 132 is integrally formed with support base 104, or alternatively, the holding bar 132 is attached separately to the upper surface 116 of the base 104 via, fasteners, dowels, pegs, clips, clamps, or detents. For example, pegs or dowels may be employed on the bottom surface of the holding bar 132, and a plurality of holes (not shown) formed sequentially, along opposite edges of the upper surface 116 to accommodate removable insertion of the pegs or dowels of the holding bar 132 to allow users to adjust the position of the holding bar 132 on the upper surface 116 support base 104. In yet another embodiment, the support base 104 may include magnetic components including two magnets each provided on both the upper surface 116 and the holding bar 132, or use of a magnet and metal combination, for attachably positioning the holding bar 132 to the upper surface 116 of the support base 104 via, magnetic force.

Support base 104 includes a back bar 142 having a planar top 144, a front vertical side 146, and a back wall defining the back 148 of support base 104. The back bar 142 extends across, or traverses, the upper surface 116 of the support base 104, along the back portion of the support base 104 so that the front vertical bar side 146 is parallel to the vertical side 138 of the holding bar 132, defining a holding recess generally denoted at 150 for resting the peripheral edge of an electronic equipment 300, as shown in FIG. 5. The back bar 142 is configured to support a portion of the cover 102 when folded in a closed position. As such both planar tops 132, 144 of the holding bar 132, and back bar 142 help to support the downward load-bearing weight of the cover 102, and any article placed on the outer, top surface of the cover 102 during use.

Figure 3:
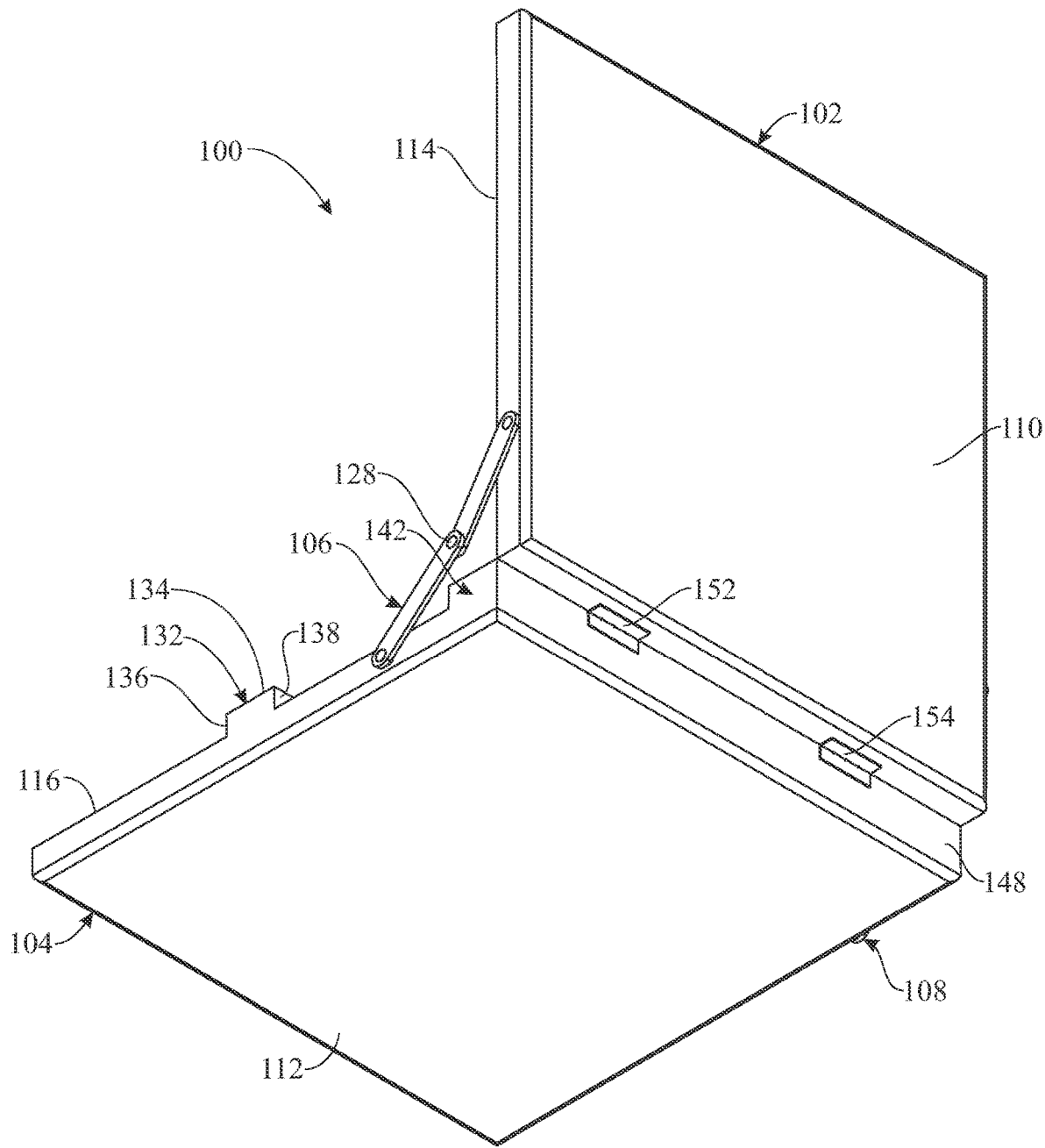
FIG. 3 presents a back, perspective view of the portable, collapsible support of FIG. 2, showing the support base having a planar bottom surface, a pair of hinges attached to the cover and support base to provide pivoting motion between the cover and base, with the cover shown in the releasably, locked, open position.

Turning to FIG. 3, there is shown a bottom, perspective view, of the portable, collapsible support 100, in accordance with the embodiment of the present invention. The cover 102 is pivotably attached to the support base 104, via a pair of hinges denoted at 152, 154 to further stabilize the positional layout of the cover 102 during use. Each hinge 152, 154 has one end attached to a side edge of the cover 102, and another end attached to the back end 148 of the base 104. The hinges 152, 154 may comprise any well-known hinge available on the market including for example, a barrel hinge, butterfly hinge, flush hinge, pivot hinge or spring hinge. The hinges 152, 154 may comprise a plastic or metal material. The articulated combination of both the locking arms 128, 130, and the hinges 152, 154 provide for steady and structurally sound articulation of the cover 102 about the base 104.

With reference made to FIG. 4, there is shown a front, perspective view of the portable, collapsible support 100, shown in use holding and supporting electronic equipment including a programmable logic computer PLC 200 that is removably attached to the inner surface 114 of the cover 102. The portable, collapsible support 100 accommodates holding and supporting electronic equipment 200 when repairing, testing, programming, or demonstrating such equipment 200 at various geographical locations, or in different rooms or buildings. In doing so, the bottom planar surface 112 of the support base 104 is disposed on a horizontal surface, and the cover 102 is pivoted open about the hinges 152, 154, and locking arms 106 and 108. Each pair of links operate to lock the locking arms 106, 108 in place to retain the cover 102 open when supporting the load bearing weight of equipment 200. With the cover 102 placed in an open, locked position, users are free to removably attach electronic equipment such as a PLC 200, to the inner surface 114 of the cover 102. A pair of holding brackets 124, 126, associated with the PLC 200, are mounted onto designated mounting pegs 120, 122, as also shown in FIG. 2. Each mounting peg 120, 122 extends outwards from the inner surface 114 of the cover 102, a certain distance, allowing the back end 156 of the PLC 200 to rest against any Din rail 118 that is mounted to the planar inner surface 114 of the cover 102 thus better aligning the top of the PLC 200 along a horizontal axis, and the back 156 of the PLC 200 situated along a vertical axis. It will be noted that the mounting pegs 120, 122 can be configured to allow users to adjust the outwardly extending distance of each peg 120, 122 from the inner surface 114 to accommodate holding electronic equipment on the cover 102 in proper alignment or orientation including away from one or more mounted Din rails. In one embodiment, the PLC 200 may be equipped with a Din rail bracket that can be removably attached to Din rail 118 provided below mounting pegs 120, 122. As such Din rail 118, and mounting pegs 120, 122 provide alternate mechanisms to attach electronic equipment such as a PLC 200 to the inner surface 114 of the cover 102 when testing, repairing, programming, or demonstrating the PLC 200. It is noted that the front region 158 of the base support 104 can be used to hold tools, testing equipment, or other objects thereon. In one embodiment, the front region 158 may be used to support a notepad, or an operative or testing instruction sheet allowing users to take notes, or read particular testing instructions, or other operational criteria associated with the PLC 200.

Turning to FIG. 5, there is shown a front, perspective view of the portable, collapsible support 100 for holding and supporting electronic equipment, such as a human-machine interface HMI 300. HMI 300 devices generally include a viewing screen having a peripheral edge similar to the configuration of an electronic tablet. The need to view the screen is vital to ascertain the content displayed from the HMI 300 when testing, making repairs, programming, or simply demonstrating the HMI 300 to potential end users. The portable, collapsible support 100 is designed to support and hold HMIs 300 in proper position for easy accessibility. In practice, an HMI 300 is disposed within the holding recess 150, as illustrated in FIG. 2 so that the peripheral edge 160 of the HMI 300 butts against the outer surface of vertical sidewall 138 of the holding bar 132 while resting on the upper surface 116, and the top back portion of the HMI 300 rests against the inner surface 114 of the cover 102 securely holding the HMI 300 in place in a generally vertical position providing viewable access to the display screen of the HMI 300. It will be appreciated that adjusting the position of the holding bar 132 further towards the back 148 of the support base 104 directly affects the vertical alignment of the HMI 300. Thus, in one embodiment, the portable, collapsible holding support 100 may include an adjustable holding bar 132 that allows users to move the holding bar 132 towards the front edge 140 or back end 148 of the base 104 to adjust vertical positioning of the HMI 300.

It is noted that feet may be provided on the planar bottom surface 112 of the support base 104 to prevent the base 104 from sliding along a horizontal support surface during use, and to absorb vibrations that may emanate from, or be associated with the horizontal support. For example, such feet may include rubber, plastic or metal pads or posts affixed to the bottom corners of the bottom surface 112 of base 104. Also, one or more holes can be formed anywhere through the body of the cover 102, and/or support base 104 to allow passage of one or more cables including a power cable for connecting an electrical power plug to electronic equipment 200, 300 stored and supported on the portable, collapsible support 100. For example, a PLC 200 or HMI 300 may include a power port that is located on the back of the device where the predrilled hole in the cover 102 or base 104 is used to make it easier for users to pass the an electrical power plug or connector of a power cable through to power the equipment 200, 300 when held on the portable, collapsible support 100, if needed.

Figure 6:
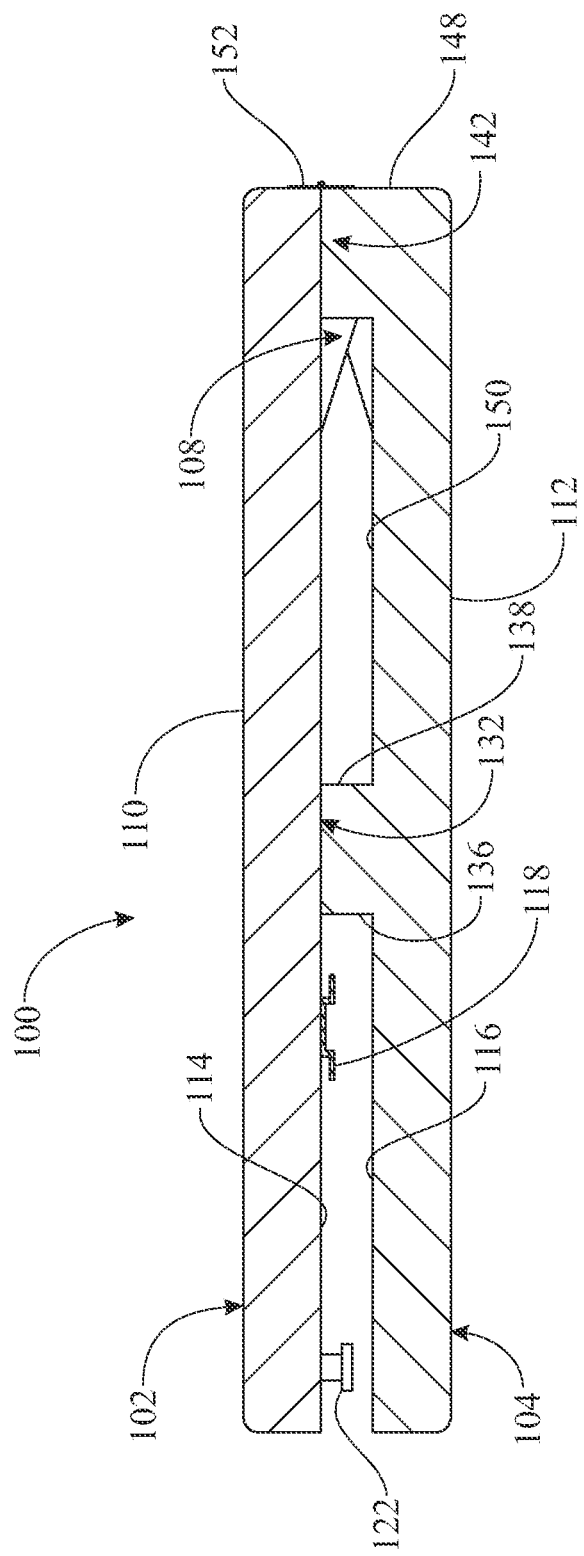
FIG. 6 presents a side-cross sectional view of the portable, collapsible support, showing the cover in a closed position on the support base and resting on planar tops of the holding bar and the back bar for easily carrying and transporting the collapsible support from one location to another.

The portable, collapsible support 100 is easily transported for use in various locations including for example, manufacturers or processing plants, vendors, trade shows, test labs, training seminars, schools, conventions, hospitals, warehouses, or at other facilities. As illustrated in FIG. 6, in preparation of transport, slight pressure is applied to each articulating joint 128, 130 of locking arms 106, 108 to articulate the links of each arm 106, 108 to pivot together, allowing the cover 102 to pivot and fold downwards, via hinges 152, and 154. A latch, magnetic mechanism, string, tether, friction connector, or other mechanism may be employed to maintain the cover 102 closed, if desired. For example, in one example, a magnetic arrangement may be implemented to releasably maintain the cover 102 in a closed position on the support base 104 when not in use. It is noted that portions of the inner surface 114 of cover 102 rest securely on the planar tops 134, 144 of the holding bar 132, and back bar 142, respectively, shown in FIG. 2, to support a load bearing weight that may be provided on the outer surface 110 of the cover 102. For instance, there are times when the support 100 may be stored in a service van, and other tools, or articles are unintentionally placed on top cover 102 be inadvertent action on the part of a service person.

With reference now to FIGS. 7 through 11, a secondary embodiment of the collapsible support 400, is generally shown. One will appreciate that the collapsible support 400 is similarly numbered as collapsible support 100, with the reference numbers of the collapsible support prefixed with a '4.' As shown, the portable, collapsible support 400 generally comprises a cover 402 that is pivotably, or foldably attached to a support base 404 via, articulating connections comprising a pair of locking arms 406, 408, and a pair of hinges 464, as better illustrated in FIG. 8. In one exemplary embodiment, both the cover 402, and support base 404 comprises a square geometric shape, and each include planar surfaces 410, 412, 414, and 416. As illustrated in the FIG. 7, planar surface 414 may be depicted as an inner surface, and planar surface 416 depicted as an inner surface, or an upper surface. The geometric and dimensional shape of cover 402 and base 404 may comprise any variety of different sizes, lengths, widths, heights, and shapes. The structural dimension of the cover 402 and base 404 is selected to physically support and hold electronic equipment having different weight bearing loads. As such, the cover 402, and support base 404 may be constructed from any of metal, a durable plastic or nylon material, or natural, synthetic or non-synthetic materials including wood. The material selected to construct the portable, collapsible support 400 should take into consideration the possibilities that the support 400 will be used in harsh, or wet environments, thus water resistant, or rust proof, or corrosion resistant materials can be employed. As such, the cover 402, and base 404 may be constructed from a galvanized steel, aluminum, or stainless steel material. Alternatively, the cover 402, and/or base 404 may be coated with a clear plastic protective film or polymer, a rubber coating, or a rust resistance paint.

Figure 7:
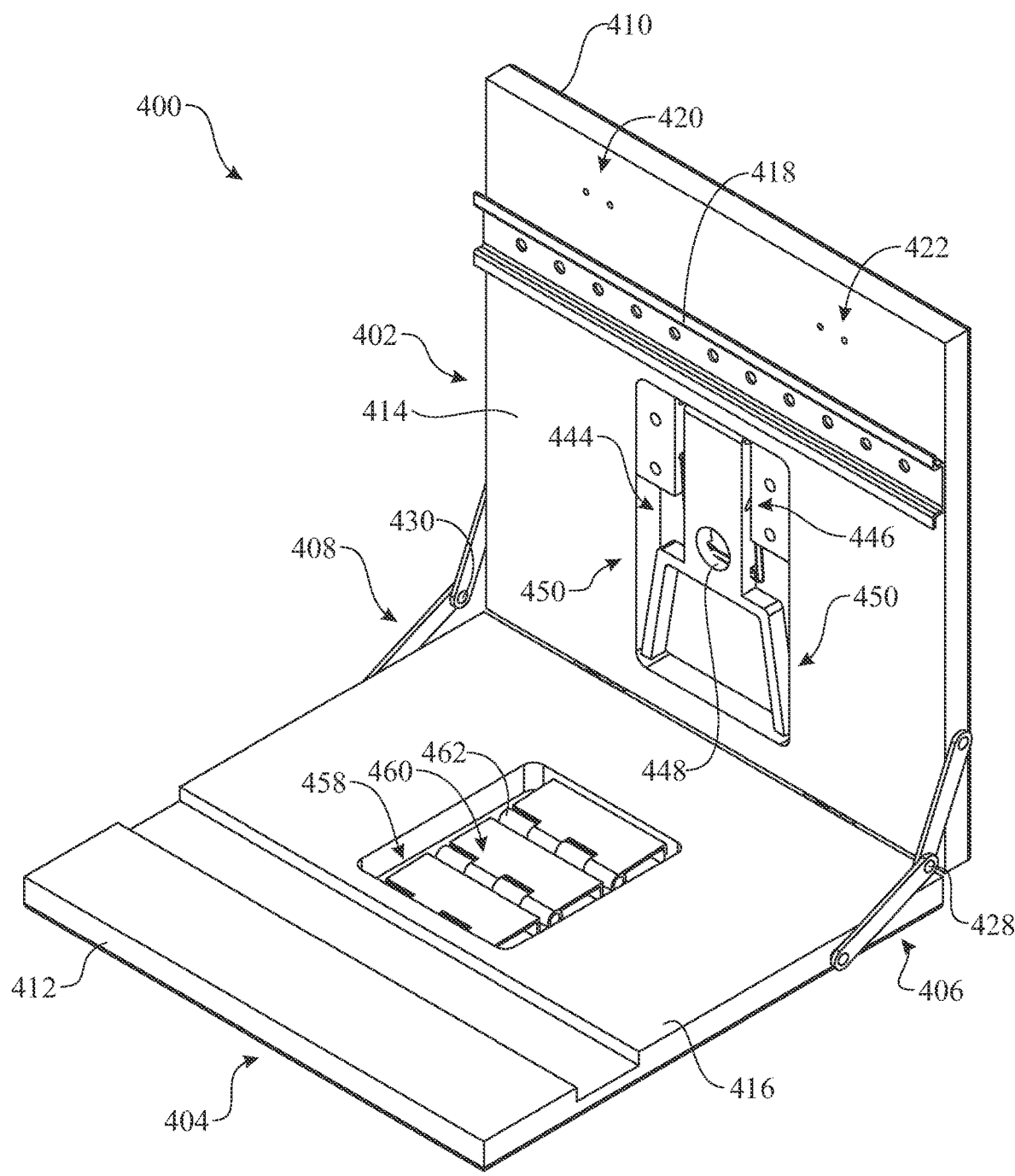
FIG. 7 presents a front, perspective view of a portable, collapsible support for repairing, testing, programming, or demonstrating electronic equipment such as programmable logic controllers (PLC), human machine interfaces (HMI) or other industrial equipment or devices, in a second novel embodiment, showing the cover in a releasably, locked, open position, via locking arms.
Figure 9:
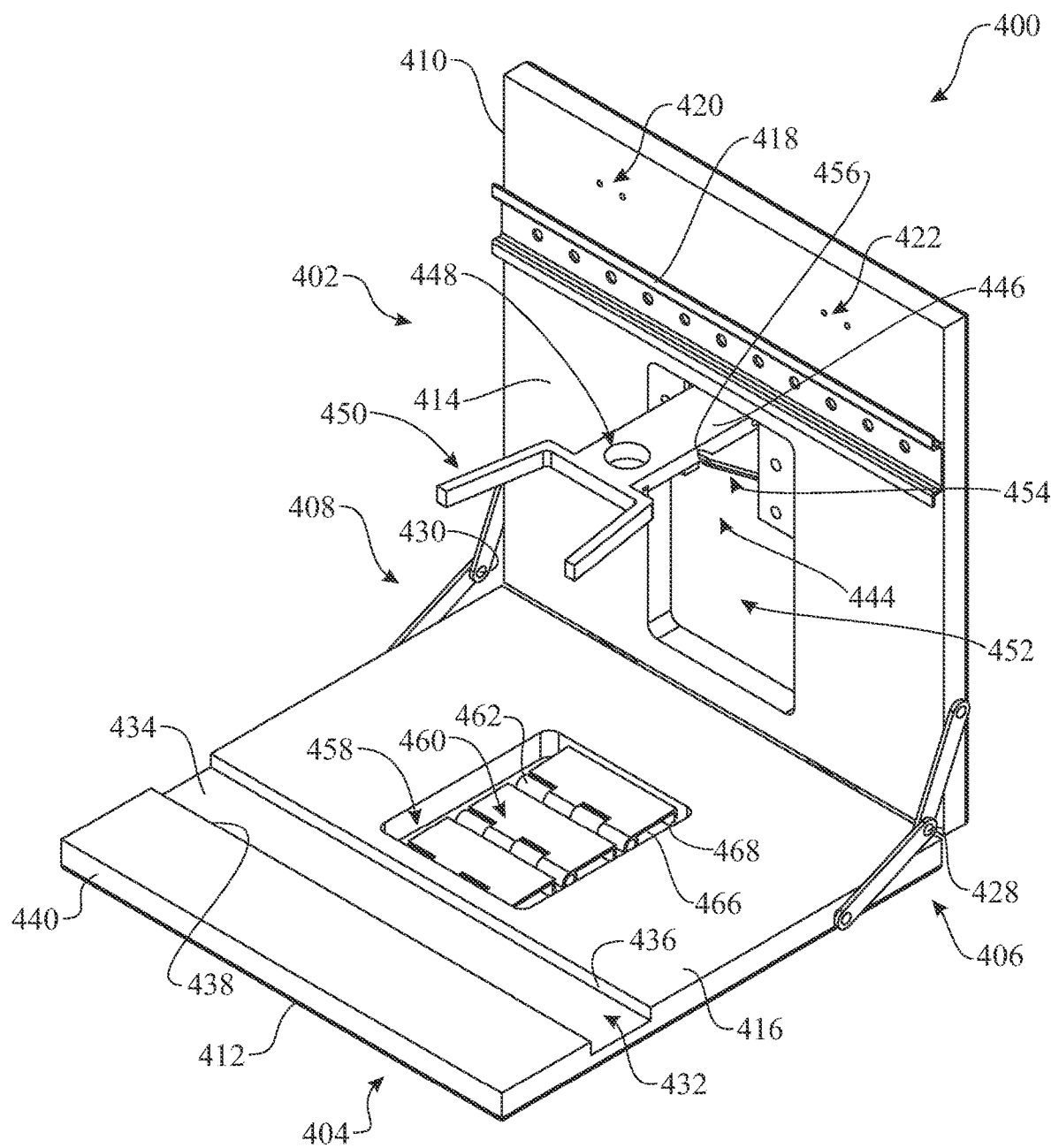
FIG. 9 presents a front, perspective view of the portable, collapsible support, showing the cover in a releasably, locked, open position, via locking arms, and an extendable arm for supporting an instrument.

With continued reference to FIGS. 7 and 9, the collapsible support 400 includes at least one Din rail 418 that is attached to the inner surface 414 of the cover 402, and adapted to removably hold electronic equipment having Din rail mountable brackets. For example, electronic equipment, such as PLCs. often include Din rail mountable brackets situated on the back wall of the PLC to removably mount the PLC to Din rails. As such, Din rail 418 accommodates removeable attachment of PLC's equipped with Din rail mountable brackets. It is understood that the collapsible support 400 may include any number of Din rails 418 each having the same or different lengths. In exemplary embodiment, Din rail 118 is attached to the inner surface 414 of the cover 402 along a horizontal axis but may be oriented vertically or diagonally if preferred. Din rail 418 may comprise a durable plastic, aluminum, or steel material able to withstand the loaded bearing weight of electronic equipment when supported on the Din rail 418. One or more Din rails 418 are attached to the inner surface 414 of the cover 402 using fasteners including for example, screws, a strong adhesive, clips, clamps, nuts and bolts, rivets, or other fasteners.

A pair of apertures 420, 422 are provided on the inner surface 414 of the cover 402 design to receive fasteners or pegs that hold electronic equipment with holding brackets. The plurality of holes 420, 422 can be pre-drilled anywhere within the inner surface 414 of the cover 402 to accommodate removable insertion of the mounting pegs. The plurality of holes 420, 422 allow positional adjustment of the mounting pegs, giving users or service man the ability to use the support 400 for holding electronic equipment that may have different holding brackets, or apertures.

Figure 10:
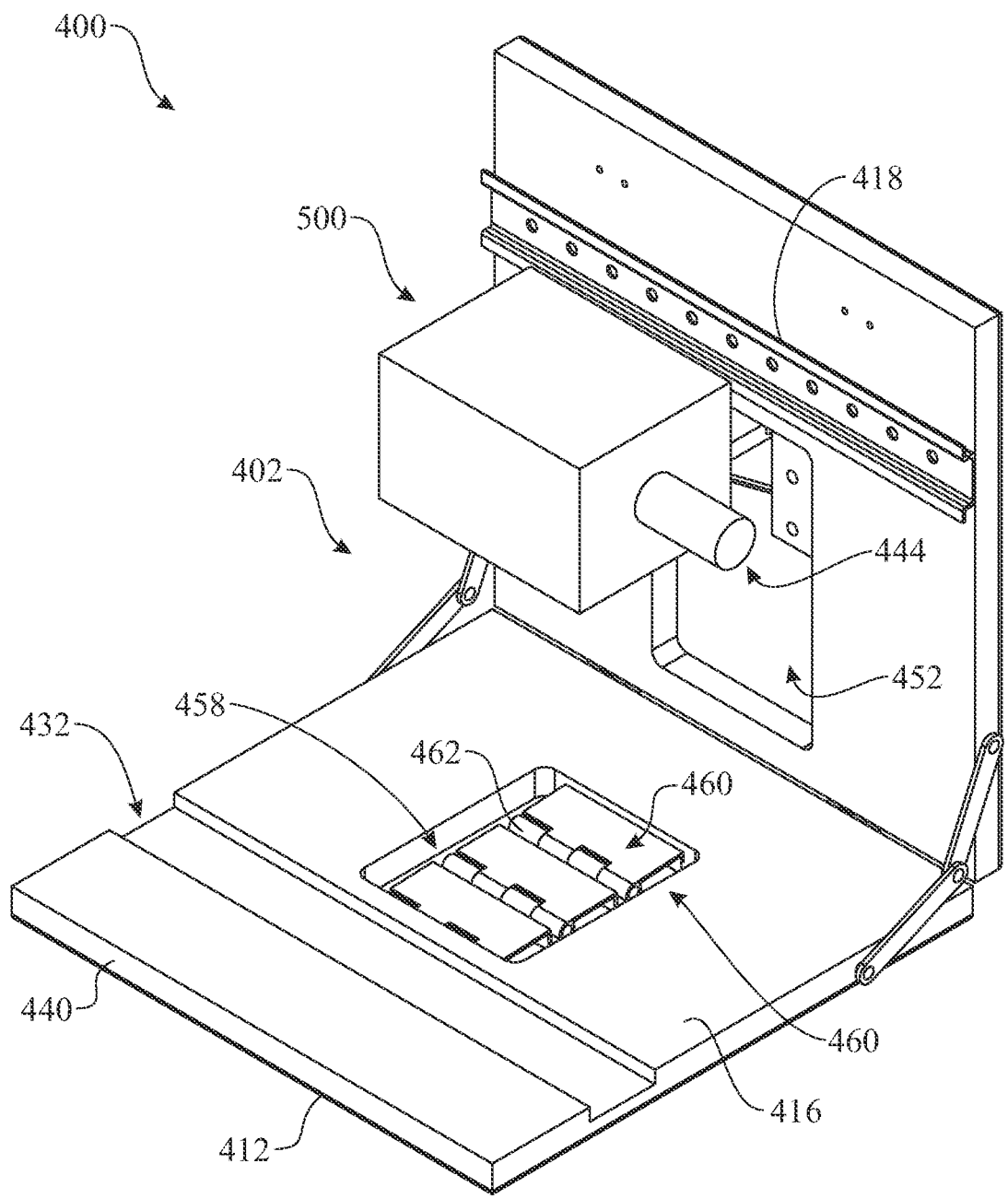
FIG. 10 presents a front, perspective view of the portable, collapsible support, showing the cover in a releasably, locked, open position, via locking arms, and an extendable arm supporting an instrument.

As shown in FIGS. 7, 9 and 10, the cover 402 is pivotably attached to support base 404, via, a pair of locking arms 406, 408 disposed on opposite sides of the cover 402 and base 404 to pivotably lock the cover 402 in an open position. Each locking arm 406, 408 comprises a pair of links where each link includes a first end and a second end. Each second end is attached together by an articulated connection 428, and 430, and a first end of one link is attached to the side edge of the cover 402, and a first end of another link is attached to the side edge of the base 404. As iterated above, each articulated connection 428, 430 may generally comprise a general configuration that allows for a user to apply a slight pressure at the articulated point to unlock the locking arms 406, 408 allowing the pair of links to fold and the cover 402 to pivot downwards. The locking arms 406, 408 may comprise any of durable plastic, metal such as aluminum or stainless steel, or any well-known locking arms currently available on the market. It is understood that other well-known articulating mechanism can be used to replace the locking arms 406, 408.

Figure 11:
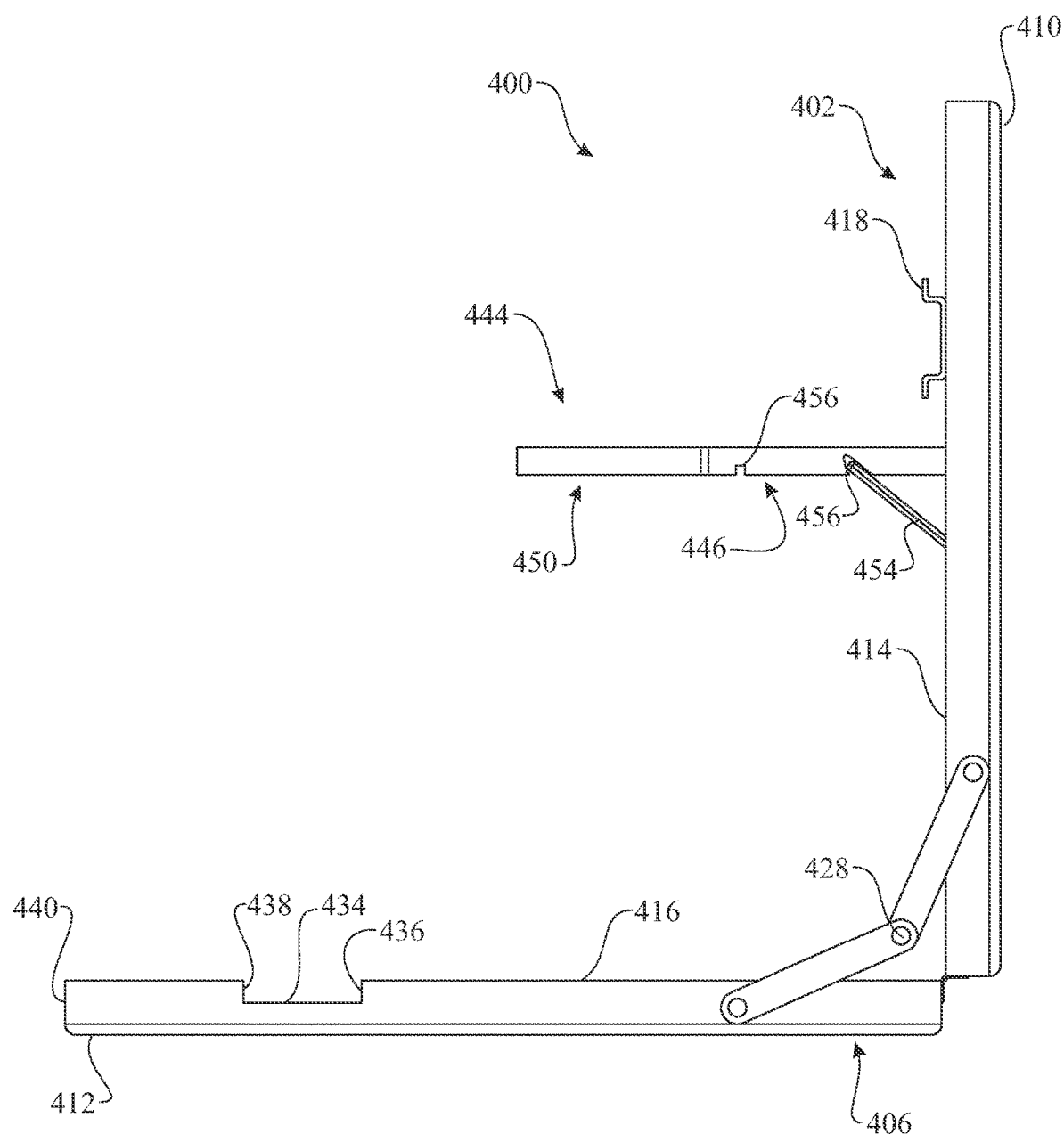
FIG. 11 presents a left side elevation view of the portable, collapsible support, showing the cover in a releasably, locked, open position, via locking arms, and an extendable arm for supporting an instrument.

With continued reference made to FIG. 9, a channel 432 is provided on the upper surface 416 of the support base 404 to functionally hold electronic equipment in place to prevent the equipment from sliding outwards. In one embodiment, a generally rectangular channel having a planar bottom 434, and two vertical sides 436, 438 extending transversely on the upper surface 416 where each vertical side 436, 438 includes a predetermined height, defining the channel 432. The upper surface 416 of the collapsible support 400 may also include a recess 458 substantially centrally located on the base 404. Inside of the recess 458 there may include a plurality of movable members 460 that are hingeably attached via a hinge 462 to the base 404, allowing the movable member 460 to pivot upwardly from its resting position, as seen in FIG. 9, to an upward position. The movable member 460 may include a platform surface 466 and a lip 468 for holding instruments in a particular orientation when the movable member is not in a resting position. The collapsible support 400 may also include another recess 452 on its cover 402. Inside of recess 452, the collapsible support 400 may include an articulating member 444 that includes an arm 446 having an aperture 448, and a support end 450 that as shown looks like a pair of prongs or fingers. The articulating member 444 is hingeably attached to the cover and pivots thereabout. As shown in FIG. 11, inside of a recess, the cover 402 also includes a locking arm 452 that pivots about a hinge attached to the cover 402. The locking arm 452 locks the articulating member 444 in an upright position by engaging a notch 456 on the arm 446 of member 444.

With reference made to FIGS. 9 and 10, there is shown the collapsible support 400, shown in use holding and supporting an instrument 500 that is removably placed on the movable arm 444 extending from the inner surface 414 of the cover 402. The portable, collapsible support 400 accommodates holding and supporting electronic equipment 500 when repairing, testing, programming, or demonstrating such equipment 500 at various geographical locations, or in different rooms or buildings. In doing so, the bottom planar surface 412 of the support base 404 is disposed on a horizontal surface, and the cover 402 is pivoted open about the hinges 452, 454, and locking arms 406 and 408. Each pair of links operate to lock the locking arms 406, 408 in place to retain the cover 402 open when supporting the load bearing weight of equipment 500. With the cover 402 placed in an open, locked position, users are free to articulate the movable arm 444 (if desired) to removably place an instrument 500 on the arm. Alternatively, for other types of equipment, a pair of holding brackets associated with other equipment, such as a PLC, are mounted onto designated mounting pegs 120, 122, see FIG. 2. Each mounting peg 120, 122 extends outwards from the inner surface 114 of the cover 102, a certain distance, allowing the back end 156 of the PLC 200 to rest against any Din rail 118 that is mounted to the planar inner surface 114 of the cover 102 thus better aligning the top of the PLC 200 along a horizontal axis, and the back 156 of the PLC 200 situated along a vertical axis.

Figure 8:
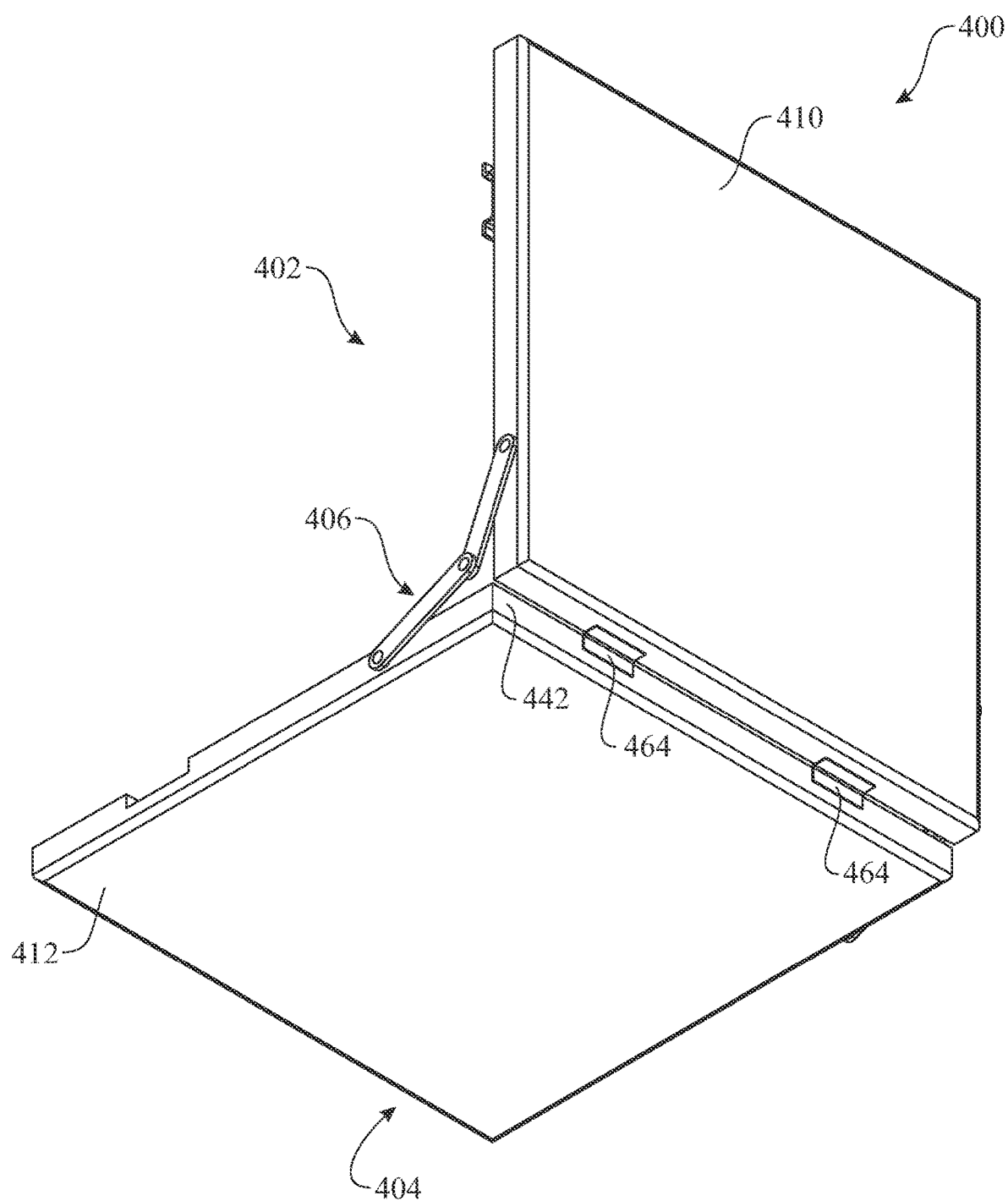
FIG. 8 presents a back, perspective view of the portable, collapsible support of FIG. 7, showing the support base having a planar bottom surface, a pair of hinges attached to the cover and support base to provide pivoting motion between the cover and base, with the cover shown in the releasably, locked, open position.

Turning to FIG. 8, there is shown a bottom, perspective view, of the portable, collapsible support 400, in accordance with the embodiment of the present invention. The cover 402 is pivotably attached to the support base 404, via a pair of hinges denoted at 464 to further stabilize the positional layout of the cover 402 during use. Each hinge 464 has one end attached to a side edge of the cover 402, and another end attached to the back end 442 of the base 404. The hinges 464 may comprise any well-known hinge available on the market including for example, a barrel hinge, butterfly hinge, flush hinge, pivot hinge or spring hinge. The hinges may comprise a plastic or metal material.

It will be understood that the portable, collapsible support 100, 400 is constructed or fabricated using any durable, rigid material, including but not limited to, synthetic or non-synthetic wood, plastic, or nylon. If a metal material is used to construct the support 100, 400, then appropriate grounding connections can be provided to prevent hazard potentials on the conductive metal surfaces of support 100, 400. Further, the portable, collapsible support 100, 400 may include protection covers that are permanently or removably attached to, the four corners of the cover 102 and support base 104, or alternatively, such corners can be rounded to prevent injury or to protect the support 100 upon falls. One or more handles may be provided anywhere on the cover 102, or base support 104 for easily carrying the portable support 100 by hand. In one example, the handle may comprise a strap, a metal or plastic u-shaped member, or an elongate hole that is formed in either or both of the cover 102 and support base 104.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A portable, collapsible support for holding electronic equipment, the portable, collapsible support comprising:
    a base including opposite side edges, a planar upper surface opposite a bottom surface, a channel traversing the planar upper surface of the base, and a recess provided substantially at a central portion of the base;
    at least one hinge plate having a resting surface and raised lip hingeably and movably attached to an inner surface of the recess on the base for supporting equipment when the hinge plate is in an erect position;
    a cover including opposite side edges, and a planar inner surface opposite an outer surface, and a recess provided on the planar inner surface of the cover,
    a movable arm hingeably attached to an inner surface of the recess provided on the cover, the movable arm configured for supporting equipment when in an erect position;
    a Din rail mounted to the planar inner surface of the cover, and
    a pair of locking arms, each locking arm having one end attached to the opposite side edges of the base, the other end attached to opposite side edges of the cover,
        wherein the pair of locking arms articulate to pivot the cover in a releasably locked, open position away from the planar upper surface, and in a closed position.

2. The portable, collapsible support of claim 1, wherein the Din rail is positioned superior to the movable arm attached to the inner surface of the recess on the cover.

3. The portable, collapsible support of claim 1, wherein the channel is positioned inferior to the at least one hinge plate attached to the inner surface of the recess on the base.

4. The portable, collapsible support of claim 1, wherein the movable arm device comprises an arm having a proximal end and a distal end, a support end extending from the distal end, a hinge member connected to the proximal end of the movable arm, and a support arm for supporting and maintaining the arm in t erect position.

5. The portable, collapsible support of claim 4, wherein in the arm of the movable arm device includes at least one notch that engages the support arm to support and maintain the arm in the erect position.

6. The portable, collapsible support of claim 4, wherein the support end includes a pair of fingers configured for removably holding an instrument.

7. The portable, collapsible support of claim 1, wherein the at least one hinge plate includes a plurality hinge plates positioned in series one in front of another, each hinge plate hingeably attached to the inner surface of the recess on the base for supporting equipment when in h erect position.

8. The portable, collapsible support of claim 1, wherein each of said pair of locking arms includes a first link having a first end and a second end, and a second link having another first end and another second end, said first end attached to said opposite side edges of said cover, and said another first end attached to opposite side edges of said base, said second end and said another second end rotatably attached together to pivot said cover in an open and closed position.

9. The portable, collapsible support of claim 8, further comprising at least one hinge having a first member rotatably attached to a second member, said first member attached to said cover, and said second member attached to said back end of said base.

10. The portable, collapsible support of claim 1, wherein the Din rail is mounted to the planar inner surface along a horizontal axis.

11. The portable, collapsible support of claim 1, further including a plurality of A apertures for receiving one or more mounting pegs disposable on the planar inner surface of the cover.

12. The portable, collapsible support of claim 11, wherein the plurality of mounting pegs are spaced apart from each other along a horizontal axis, and adjacent a top edge of the cover.

13. The portable, collapsible support of claim 1, wherein the Din rail is disposed on the planar inner surface and includes opposite rail ends that are equally spaced from the opposite side edges of the cover.

14. The portable, collapsible support of claim 11, wherein the plurality of mounting pegs and the Din rail are configured for removably holding electronic equipment or an instrument.

15. A portable, collapsible support for holding electronic equipment, the portable, collapsible support comprising:
    a base including opposite side edges, a planar upper surface opposite a bottom surface, a channel traversing the planar upper surface of the base, and a recess provided substantially at a central portion of the base;
    at least one hinge plate having a resting surface and raised lip hingeably and movably attached to an inner surface of the recess on the base for supporting equipment when the hinge plate is in an erect position;
    a cover including opposite side edges, and a planar inner surface opposite an outer surface, and a recess provided on the planar inner surface of the cover,
    a movable arm hingeably attached to an inner surface of the recess provided on the cover, the movable arm configured for supporting equipment when in an erect position;
    a Din rail mounted to the planar inner surface of the cover, and
    a pair of locking arms, each locking arm having one end attached to the opposite side edges of the base, the other end attached to opposite side edges of the cover,
        wherein the pair of locking arms articulate to pivot the cover in a releasably locked, open position away from the planar upper surface, and in a closed position,
        wherein the recess on the base is positioned inferior to the at least one hinge plate attached to the inner surface of the recess on the base, and
        wherein the Din rail is positioned superior to the movable arm attached to the inner surface of the recess on the cover.

16. The portable, collapsible support of claim 15, wherein the movable arm device comprises an arm having a proximal end and a distal end, a support end extending from the distal end, a hinge member connected to the proximal end of the movable arm, and a support arm for supporting and maintaining the arm in t erect position.

17. The portable, collapsible support of claim 15, wherein the at least one hinge plate includes a plurality hinge plates positioned in series one in front of another, each hinge plate hingeably attached to the inner surface of the recess on the base for supporting equipment when in the erect position.

18. The portable, collapsible support of claim 15, wherein each of said pair of locking arms includes a first link having a first end and a second end, and a second link having another first end and another second end, said first end attached to said opposite side edges of said cover, and said another first end attached to opposite side edges of said base, said second end and said another second end rotatably attached together to pivot said cover in an open and closed position.

19. The portable, collapsible support of claim 15, further including a plurality of apertures for receiving a plurality of mounting pegs disposable on the planar inner surface of the cover, and the plurality of mounting pegs are spaced apart from each other along a horizontal axis, and adjacent a top edge of the cover.

20. A portable, collapsible support for holding electronic equipment, the portable, collapsible support comprising:
- a base including opposite side edges, a planar upper surface opposite a bottom surface, a channel traversing the planar upper surface of the base, and a recess provided substantially at a central portion of the base;
- at least one hinge plate having a resting surface and raised lip hingeably and movably attached to an inner surface of the recess on the base for supporting equipment when the hinge plate is in an erect position;
- a cover including opposite side edges, and a planar inner surface opposite an outer surface, and a recess provided on the planar inner surface of the cover, the cover including a plurality of apertures for receiving a plurality of mounting pegs disposable on the planar inner surface of the cover, and the plurality of mounting pegs are spaced apart from each other along a horizontal axis, and adjacent a top edge of the cover,
- a movable arm hingeably attached to an inner surface of the recess provided on the cover, the movable arm configured for supporting equipment when in an erect position, comprising;
  - an arm having a proximal end and a distal end,
  - a support end extending from the distal end,
  - a hinge member connected to the proximal end of the movable arm, and
  - a support arm for supporting and maintaining the arm in t erect position,
    - wherein the arm includes at least one notch that engages the support arm to support and maintain the arm in h erect position, and
    - wherein the support end includes a pair of members configured for removably holding an instrument;
- a Din rail mounted to the planar inner surface of the cover, and
- a pair of locking arms, each locking arm having one end attached to the opposite side edges of the base, the other end attached to opposite side edges of the cover,
  - wherein the pair of locking arms articulate to pivot the cover in a releasably locked, open position away from the planar upper surface, and in a closed position,
  - wherein the recess on the base is positioned inferior to the at least one hinge plate attached to the inner surface of the recess on the base, and
  - wherein the Din rail is positioned superior to the movable arm attached to the inner surface of the recess on the cover.

* * * * *